3,272,646
Patented Sept. 13, 1966

3,272,646
IMPREGNATED POROUS PHOTOCHROMIC GLASS
John Andrew Chopoorian, Stamford, and Kay Oesterle Loeffler, Norwalk, Conn., assignors to American Cyanamid Company, Stamford, Conn., a corporation of Maine
No Drawing. Filed Apr. 16, 1963, Ser. No. 273,306
6 Claims. (Cl. 117—33.3)

This invention relates to variable transmission materials which are colorless and transparent, become colored upon exposure to ultraviolet light and return to their colorless form upon removal of said ultraviolet light.

More particularly, this invention relates to colorless, transparent, variable transmission porous glass, having impregnated in the pores thereof, a solution of an aromatic diaminetetraacetic acid, which glass darkens and remains transparent upon contact with ultraviolet light but reverts to its colorless condition upon removal of said ultraviolet light.

The use of photochromic materials as the active ingredients in such applications as data storage devices, reflectants for incident radiation, photochemical printing and the like, is well known in the art. However, there has been, to our knowledge, no disclosure of the production of impregnated porous photochromic glass which is colorless and transparent, becomes darkened upon contact with ultraviolet light while still remaining transparent, and reverts to its colorless form upon removal of said ultraviolet light.

We have discovered that solutions of aromatic diaminotetraacetic acid compounds may be incorporated into porous glass and function photochromically, as such, in said glass, when contacted with ultraviolet light. The solutions of the aromatic diaminotetraacetic acid compounds do not so function independently of the glass substrate, but we have surprisingly found that these solutions function photochromically when in contact with ultraviolet light while absorbed in the pores of said glass.

It is therefore an object of the present invention to provide novel variable transmission materials which are colorless and transparent.

It is a further object of the present invention to provide colorless, transparent, variable transmission porous glass having impregnated in the pores thereof, a solution of an aromatic diaminotetraacetic acid compound, which glass darkens upon contact with ultraviolet light and returns to its original colorless form upon removal of said light.

These and other objects will become more apparent to those skilled in the art upon reading the more detailed description set forth hereinbelow.

PHOTOCHROMISM

Molecules or complexes which undergo reversible photo-induced color changes are termed photochromic systems. That is to say, in the absence of activating radiation, the system has a single stable electronic configuration with a characteristic absorption spectrum. When the system is contacted with ultraviolet irradiation, the absorption spectrum for the system changes drastically, but when the irradiation source is removed, the system reverts to its original state.

Photochromism has been observed in inorganic and organic compounds both in solution and solid state. Although the exact mechanism of color change varies markedly in individual systems, there are three major factors which govern the behavior of a photochromic system.

A. *Absorption of incident radiation*

According to the quantum theory, each absorbed quantum creates one activated molecule and only absorbed radiation can produce a chemical change. Variables which control the number of photons absorbed include the concentration and extinction coefficient of the photochrome, the path length of light in the material, the screening coefficients of other components of the system, and the wavelengths of the incident radiation.

B. *Quantum yield*

All excited molecules will not undergo transformation to the colored form, so that the quantum yields will generally be less than unity. Various deactivating processes which compete for the excited molecules include fluorescence, phosphorescence, permanent chemical change and the thermal release.

C. *The reverse reaction*

In both the forward and reverse reactions, the concentration of the colored form is dependent on the intensity of the radiation, the kinetics of the reverse reactions and temperature and solvent sensitivity of the reactions. The kinetics for the reverse reaction will normally be controlling, however some reverse reactions are thermally sensitive and are accelerated by irradiation.

The terms "photochromic compound," "photochromic substance" or "photochromic material," as used in the instant disclosure, mean compounds, substances, or materials which chrange their transmission or reflectance upon being subjected to ultraviolet or visible irradiation and subsequently revert to their original state upon subjection thereof to a different wavelength of radiation, or removal of the initial ultraviolet source.

The ability of various materials to change color and to then revert back to their original color is not a new phenomenon. In fact, such compounds have been widely used in various ways, as described above. Generally, these compounds change their color when exposed to ordinary sunlight and revert back to their original color upon removal thereof from the rays of the sun. Various other materials, however, change color only when subjected to a certain degree of irradiation, and as such, sunlight, will not effect them. High intensity radiation, such as 10–25 cal./cm.$^2$/sec. or more is necessary in regard to these compounds, while sunlight (0.2 cal./cm.$^2$/sec.) will affect the former.

We have discovered a group of photochromic compounds which surprisingly may be incorporated into porous glass thereby forming the novel products of the present invention having the several advantages mentioned above. We have found that these photochromic compounds are unique in their ability to function photochromically in situ in the porous glass substrate. That is to say, the photochromic activity of various well known solid state and solution state photochromic materials have been investigated after having been absorbed in the pores of porous glass but found inactive and therefore inapplicable for use in our novel variable transmission articles.

THE PHOTOCHROMIC MATERIALS

Various aromatic diaminotetraacetic acid solutions may be used in the production of the novel articles of the present invention. Those which we have found particularly useful in producing the photochromic glass include aqueous and alcoholic solutions of p-phenylenediaminetetraacetic acid. Said acid compound has the formula

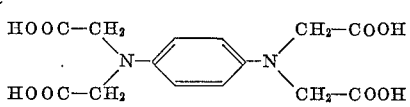

This compound is used, in forming our novel articles of manufacture, in solution concentrations ranging from about 0.005 M to about 0.06 M, preferably about 0.009

M to about 0.02 M, while incorporated into the porous glass substrate.

Since, as we later delineate hereinbelow, the photochromism of p-phenylenediaminetetraacetic is probably due to the photochemical production of radical cations similar in structure to that of Wurster's salt, ie.

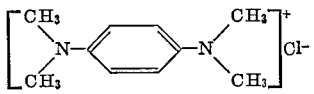

it is also possible to employ, as the photochromic material, other aromatic diaminetetraacetic acid derivatives or N-substituted aromatic diamines in producing the novel products of the present invention. That is to say, any derivative or N-substituent of the aromatic diamine having the ability to be catalyzed by ultraviolet light when in contact with glass and having molecular dimensions which are compatible with the pore diameter of the porous glass used, may be employed.

The aromatic diamine tetraacetic acid solutions may be impregnated into the porous glass by any convenient method, one of which comprises contacting said glass with the solution of the aromatic diaminotetraacetic acid under atmospheric pressure or after having evacuated the glass pores. Any other suitable impregnating means such as pressure application may also be used without departing from the spirit and scope of the invention.

The porous glass employed herein should have pore diameters ranging from about 15 A. to about 200 A., preferably about 30 A. to about 100 A., and, for these purposes, any type of porous silicon dioxide-containing glass may be used for producing the novel products of the present invention so long as the pore diameter thereof is within that above specified.

The depth of the pores of the glass, the volume of the pores per volume of glass and the amount of solution impregnated into the glass are not critical except that each must be sufficient so as to enable a color change in the impregnated photochromic solution to be visualized. Generally, we have found that a pore penetration of as little as 0.5 mm., utilizing porous glass of 40 A. average diameter, where the pore volume was 15% of the glass matrix volume, was sufficient to obtain an observable photochromic change. However, penetration ranging from about 0.2 mm. to about 2.0 mm. and pore volumes from about 10% to about 50% of the glass matrix volume have been found satisfactory.

Although the above discussion has been directed principally to aqueous and alcoholic (e.g. ethanoic) solutions of the photochromic material, these solvents are not critical and it should be stressed that other alcohols such as methanol, propanol, etc., and, in general, any polar solvent which enables the compound to be completely dissolved and impregnated into the pores of the glass, may be used in the practice of the present invention.

As has been mentioned above, the aromatic diaminotetraacetic acid solutions used to produce the products claimed hereinafter are not photochromic solutions per se. It is only after incorporation into the pores of the porous glass substrate that any photochromic effects are evident.

The products of the invention are activated (darkened) by ultraviolet light of visible wavelength, i.e. wavelengths ranging from about 3650 A. to about 3950 A. and bleach in ambient light or darkness. While not wishing to be bound by any particular theory in regard to this unusual phenomena, it is possible that the effect of the incorporation of the solution into the pores of the glass and the subsequent contact of said glass with ultraviolet light is as follows. Results seem to indicate that the aqueous or alcoholic solutions of the diamine in the porous glass undergo a surface catalyzed photochromic change. The induced absorption spectrum corresponds to the radical cation of diamine independently prepared and characterized. It is possible that the diamine in close proximity with the glass matrix may react with the ultraviolet light to dissociate an election which is captured by a matrix center, and upon interruption of the activating light, optical bleaching could occur by election-radical recombination. Also we could postulate that photoionization is followed by radical-radical combination and optical bleaching. These second two theories on optical bleaching are not entirely supported by evidence obtained however, and the tendency to lean toward the first theory set forth is believed more valid.

Aromatic diaminotetraacetic acid compounds, including p-phenylenediaminetetraacetic acid, have been reported in an article by Michaelis et al., J. Am. Chem. Soc., 60, 1667 (1938). They may be prepared by any known method, an example of which is as follows: In a vessel under nitrogen gas flow and at a temperature of about 50° C., 0.2 M phenylenediamine is slurried in 200 mls. Over a period of 45 minutes, 1.0 M sodium chloroacetate is added with stirring to this mixture, and concentrated NaOH is added intermittently to maintain a neutral pH during the course of the reaction. For one hour after completion of acetate addition, NaOH is added until the pH remained constant at 8. The hot solution is filtered under nitrogen gas and the desired product is precipitated with 25 mls. concentrated HCl. After cooling, the precipitate is filtered and washed, first with cold dilute hydrochloric acid and finally with acetone. The pinkish white powder decomposes from 150° C. to 160° C.

The coloring and bleaching cycle of the novel products of our invention can be repeated indefinitely if the evaporation of the solvent can be prevented. That is to say, the coloring and bleaching cycle ceases to function when the solvent is removed, purposely, accidently, or naturally, i.e. by evaporation, from the pores of the porous glass. Contact with air over a prolonged period of time will also tend to deactivate the solutions. It is therefore within the scope and purview of the present invention to indefinitely entrap the solution in the pores of the glass by coating the solution impregnated glass with a film-forming material which is resistant to the water, alcohol or other solvent solution used, as the case may be. Any coating may be used for this purpose, examples of which include solutions of polymethylmethacrylate, sodium meta silicate, and the like. Other coating materials which may be used are shown, for example in U.S. Patents 2,906,724, 3,025,251, 2,982,756, 2,944,991 and the like. The coating of the glass is accomplished by dipping and air drying, dipping and cooling, spraying and allowing solvent to evaporate or by any other known coating technique, including the methods disclosed in the U.S. patents cited hereinabove.

Other methods which may be used to entrap the diamine solution may also be used without detracting from the scope of the present invention, such as by sandwiching the porous glass between sheets of optically flat glass or other transparent material and sealing them with a sealant, such as sodium meta silicate or other adhesive material. Generally, any material which is water or polar solvent insoluble may be used for the purpose of retaining the solution of diamine in the pores of the porous glass.

The articles comprising the subject matter of the present inveniton find use in many applications wherein glass is employed but the transmission of sunlight therethrough in the daylight hours is not necessarily important or desired. Indeed, it may be preferred to prevent passage of the sunlight through the glass at all times. Examples of such uses include eye glasses, windows, automobile windshields and the like, as well as skylights, novelty jewelry, decorative devices etc.

The following examples are set forth for purposes of illustration only and are not to be construed as limitations on the present invention except as set forth in the appended claims.

EXAMPLE 1

A piece of porous glass of 40 A. average pore diameter (1" x 1" x ⅛") is placed in a 0.02 M aqueous solution of p-phenylenediaminotetraacetic acid under atmospheric pressure for 30 minutes. The resultant glass is then film coated with polymethyl methacrylate, by dipping the impregnated porous glass into a 20% methylethylketone-methylisobutylketone (80/20) solution of poly(methyl methacrylate) and drying in air. The coated glass is colorless and transparent. It is contacted with ultraviolet light of 3800 A. wavelength and turns blue in 30 seconds. Upon removal of the light source, the glass returns to its colorless condition in 8 minutes. The coloring and bleaching cycle is continued 30 times with no noticeable decrease in color intensity or reversion time.

EXAMPLE 2

A piece of porous glass of 40 A. average pore diameter (1" x 1" x ⅛") is placed in a 0.005 M ethanolic solution of p-phenylenediaminotetraacetic acid under atmospheric pressure for 30 minutes. The resultant glass is then sandwiched between pieces of optically flat glass using water glass as a sealant. The resultant sandwich is colorless and transparent. It is contacted with ultraviolet light of 3900 A. and turns blue in 30 seconds. Upon removal of the light source, the glass returns to its colorless condition in 8 minutes. The coloring and bleaching cycle is continued 30 times with no noticeable decrease in color intensity or reversion time.

EXAMPLE 3

A piece of porous glass of 40 A. average pore diameter (1" x 1" x ⅛") is placed in a filter flask and attached to a vacuum system for 30 minutes. A 0.01 M aqueous solution of p-phenylenediaminetetraacetic acid is then introduced into the flask and the diamine-glass system evacuated for 30 minutes. The resultant glass is colorless and transparent. It is contacted with ultraviolet light of 3700 A. wavelength and turns blue in 30 seconds. Upon removal of the light source, the glass returns to its colorless condition in 8 minutes. The coloring and bleaching cycle is continued until evaporation of the solvent occurs with no noticeable decrease in color intensity of reversion time.

We claim:

1. An article of manufacture comprising a porous glass substrate having a pore diameter ranging from about 15 A. to about 200 A., and having a solution of an aromatic diaminotetraacetic acid contained in said pores.

2. An article of manufacture comprising a porous glass substrate having a pore diameter ranging from about 15 A. to about 200 A. and having a soluiton of an aromatic diaminotetraacetic acid contained in said pores and a water-insoluble, alcohol-insoluble, air-tight layer superimposed on said glass substrate.

3. An article of manufacture according to claim 2 wherein said layer comprises a polymer of methyl methacrylate.

4. An article of manufacture comprising a porous glass substrate having a pore diameter ranging from about 15 A. to about 200 A. and having a solution of p-phenylenediaminetetraacetic acid contained in said pores.

5. An article of manufacture comprising a porous glass substrate having a pore diameter ranging from about 15 A. to about 200 A. and having a solution of p-phenylenediaminetetraacetic acid contained in said pores and a water-insoluble, alcohol-insoluble, air-tight layer superimposed on said glass substrate.

6. An article of manufacture according to claim 5 wherein said layer comprises a polymer of methyl methacrylate.

References Cited by the Examiner

UNITED STATES PATENTS 3,214,283  10/1965  Chopoorian _____ 252—301.4

FOREIGN PATENTS 649,852  10/1962  Canada.
1,269,822  7/1961  France.

OTHER REFERENCES

Brown et al., "Phototropism," Reviews of Pure and Applied Chemistry, vol. 11, No. 1, pp. 2–32 relied upon.

WILLIAM D. MARTIN, *Primary Examiner.*

S. W. ROTHSTEIN, *Examiner.*